US009353798B2

(12) United States Patent
Lorenz et al.

(10) Patent No.: US 9,353,798 B2
(45) Date of Patent: May 31, 2016

(54) TORSIONAL VIBRATION DAMPER ASSEMBLY, IN PARTICULAR FOR THE DRIVE TRAIN OF A MOTOR VEHICLE

(71) Applicants: Daniel Lorenz, Bad Kissingen (DE); Thomas Weigand, Schweinfurt (DE); Mathias Kopp, Bamberg (DE)

(72) Inventors: Daniel Lorenz, Bad Kissingen (DE); Thomas Weigand, Schweinfurt (DE); Mathias Kopp, Bamberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1 day.

(21) Appl. No.: 14/356,670

(22) PCT Filed: Oct. 29, 2012

(86) PCT No.: PCT/EP2012/071335
§ 371 (c)(1),
(2) Date: May 7, 2014

(87) PCT Pub. No.: WO2013/075908
PCT Pub. Date: May 30, 2013

(65) Prior Publication Data
US 2014/0302937 A1  Oct. 9, 2014

(30) Foreign Application Priority Data

Nov. 23, 2011 (DE) .......................... 10 2011 086 982

(51) Int. Cl.
| | |
|---|---|
| F16D 13/44 | (2006.01) |
| F16D 3/12 | (2006.01) |
| F16F 15/131 | (2006.01) |
| F16F 15/134 | (2006.01) |

(52) U.S. Cl.
CPC ................ *F16D 3/12* (2013.01); *F16F 15/134* (2013.01); *F16F 15/13157* (2013.01)

(58) Field of Classification Search
CPC ...... F16D 3/12; F16F 15/134; F16F 15/13157
USPC ........................ 464/69, 66.1, 68.1; 192/70.18
See application file for complete search history.

(56) References Cited

U.S. PATENT DOCUMENTS

| | | | | |
|---|---|---|---|---|
| 4,566,573 | A * | 1/1986 | Lane, Jr. ................ | F16D 13/71 192/70.18 |
| 4,790,419 | A * | 12/1988 | Loizeau ............... | F16F 15/1397 192/70.18 X |
| 6,289,860 | B1 * | 9/2001 | Speckhart ................. | F01L 1/02 |
| 2009/0125202 | A1 * | 5/2009 | Swank .............. | F16F 15/12353 |

FOREIGN PATENT DOCUMENTS

| | | |
|---|---|---|
| DE | 102011007118 | 12/2011 |
| WO | WO2010/043301 | 4/2010 |

\* cited by examiner

*Primary Examiner* — Gregory Binda
(74) *Attorney, Agent, or Firm* — Cozen O'Connor

(57) ABSTRACT

A torsional vibration damping arrangement, particularly for the drivetrain of a vehicle, includes an input region (12) to be driven in rotation around an axis of rotation (A) and an output region (20), wherein a first torque transmission path (14) and parallel thereto a second torque transmission path (16) and a coupling arrangement (18) for superposing the torques conducted via the torque transmission paths (14, 16) are provided between the input region (12) and the output region (20), wherein a phase shifter arrangement (26) is provided in the first torque transmission path (14) for generating a phase shift of rotational irregularities conducted via the first torque transmission path (14) relative to rotational irregularities conducted via the second torque transmission path (16), and wherein the coupling arrangement (18) includes a coupling lever arrangement (54; 54a).

19 Claims, 11 Drawing Sheets

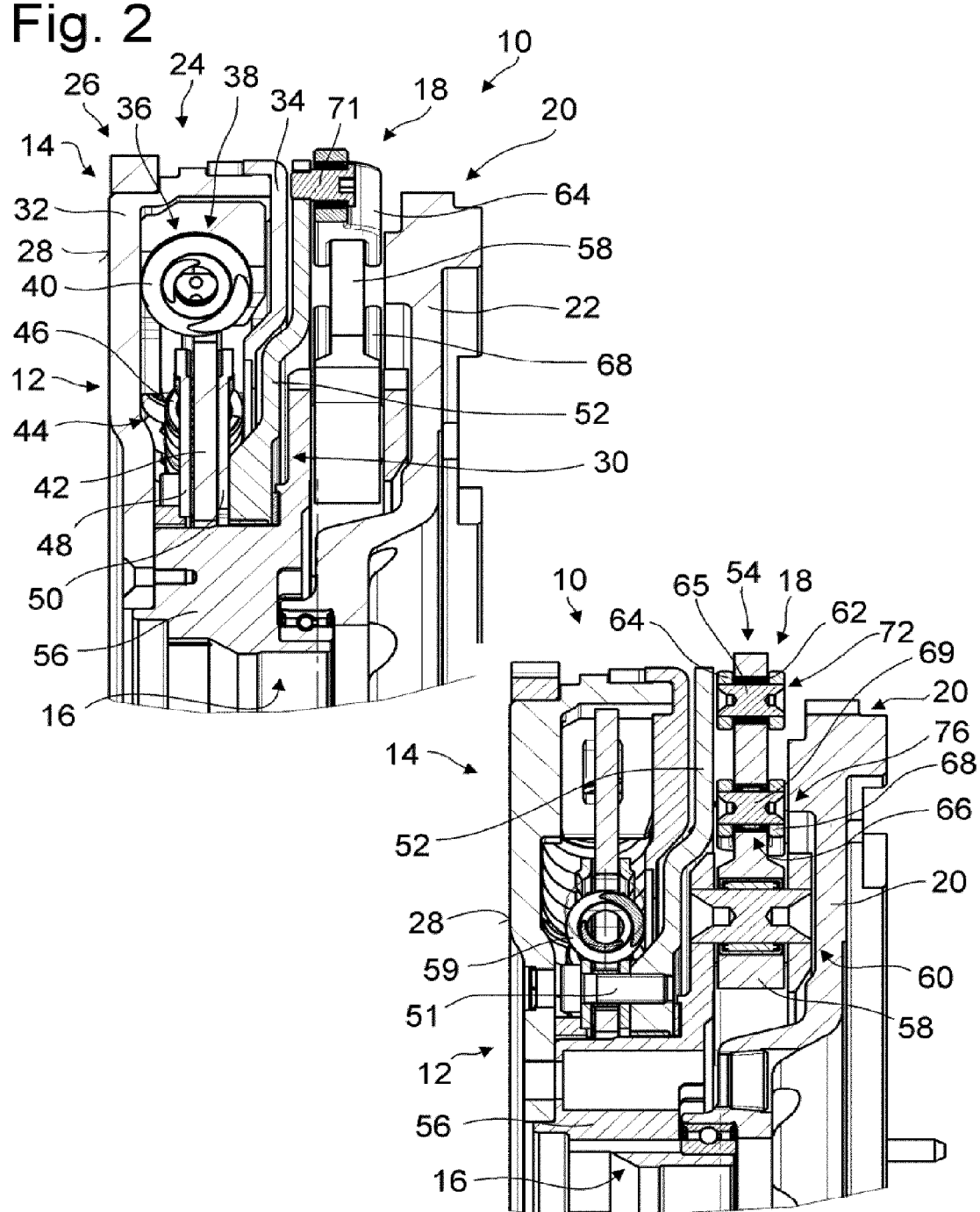

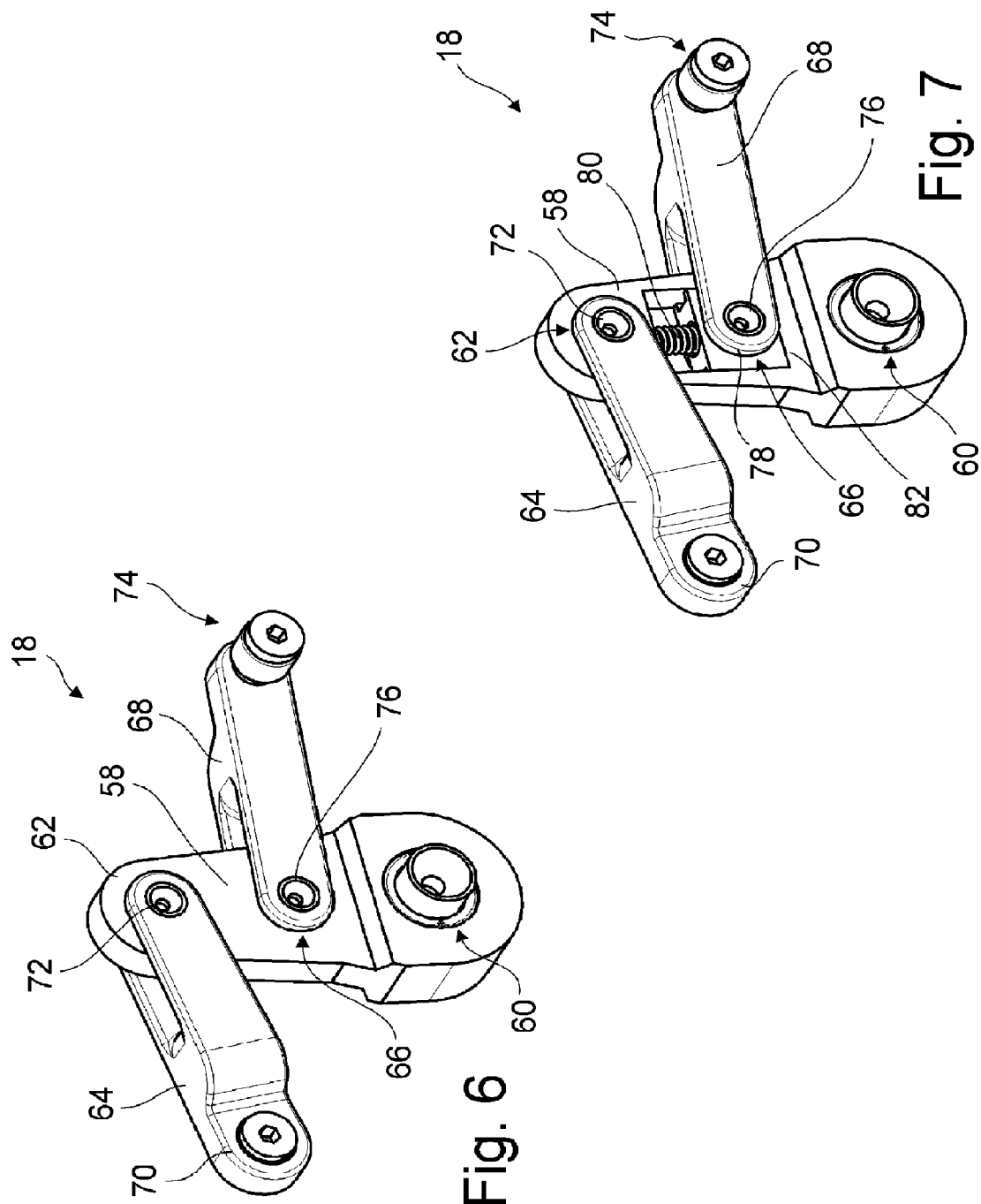

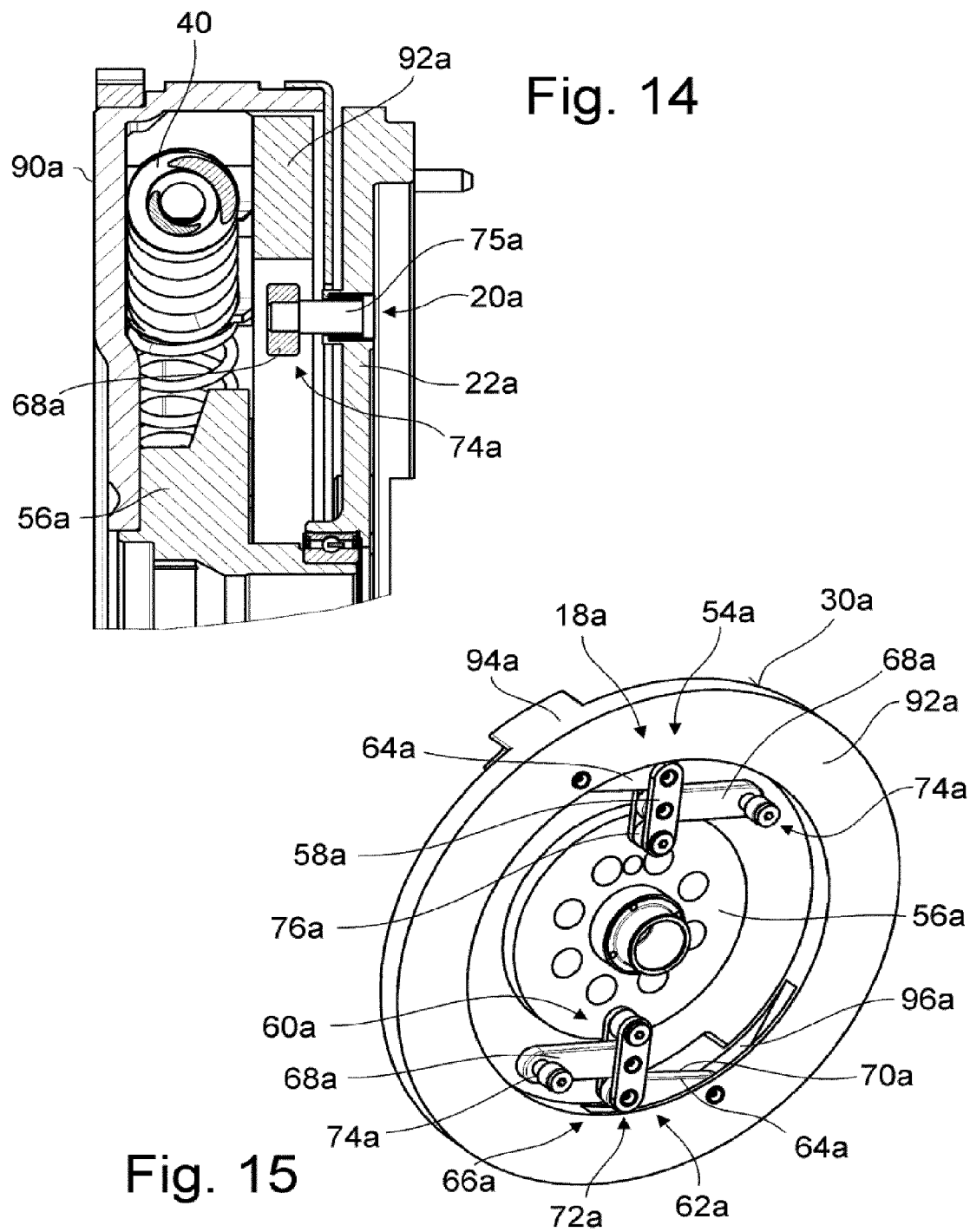

TORSIONAL VIBRATION DAMPER ASSEMBLY, IN PARTICULAR FOR THE DRIVE TRAIN OF A MOTOR VEHICLE

PRIORITY CLAIM

This is a U.S. national stage of application No. PCT/EP2012/071335, filed on Oct. 29, 2012. Priority is claimed on the following applications: Country: Germany, Application No.: 10 2011 086 982.4, filed: Nov. 23, 2011, the content of which is

FIELD OF THE INVENTION

The present invention is directed to a torsional vibration damping arrangement, particularly for the drivetrain of a vehicle, comprising an input region to be driven in rotation around an axis of rotation and an output region, wherein a first torque transmission path and parallel thereto a second torque transmission path and a coupling arrangement for superposing the torques conducted via the torque transmission paths are provided between the input region and the output region, wherein a phase shifter arrangement is provided in the first torque transmission path for generating a phase shift of rotational irregularities conducted via the first torque transmission path relative to rotational irregularities conducted via the second torque transmission path.

A torsional vibration damping arrangement known from the post-published German patent application DE 10 2011 007 118.0 divides the torque introduced into an input region, for example, through a crankshaft of an internal combustion engine, into a torque component transmitted via a first torque transmission path and a torque component transmitted via a second torque transmission path. Not only is there a static torque divided in this torque division, but also the vibrations and rotational irregularities which are generated, for example, by the periodically occurring ignitions in an internal combustion engine and which are contained in the torque to be transmitted are also divided proportionately into the two torque transmission paths. The torque components transmitted via the two torque transmission paths are brought together again in a coupling arrangement formed as a planetary gear unit and are then introduced as total torque into the output region, for example, a friction clutch or the like.

A phase shifter arrangement is provided in at least one of the torque transmission paths. This phase shifter arrangement operates like a vibration damper, i.e., it is formed with a primary side and a secondary side which is rotatable with respect to the primary side through the compressibility of a spring arrangement. In particular when this vibration system passes into a supercritical state, i.e., when it is excited with vibrations exceeding the resonant frequency of the vibration system, a phase shift of up to 180° occurs. This means that at maximum phase displacement the vibration components proceeding from the vibration system are shifted in phase by 180° with respect to the vibration components received by the vibration system. Since the vibration components conducted via the other torque transmission path do not undergo a phase shift or, if so, a different phase shift, the vibration components which are contained in the unified torque components and which are then shifted in phase with respect to one another are destructively superposed on one another so that, ideally, the total torque introduced into the output region is a static torque which contains essentially no vibration components.

It is thus an object of the present invention to provide a simply constructed torsional vibration damping arrangement which has an improved vibration damping behavior.

SUMMARY OF THE INVENTION

According to the invention, this object is met by a torsional vibration damping arrangement, particularly for the drivetrain of a vehicle, comprising an input region to be driven in rotation around an axis of rotation and an output region, wherein a first torque transmission path and parallel thereto a second torque transmission path and a coupling arrangement for superposing the torques conducted via the torque transmission paths are provided between the input region and the output region, wherein a phase shifter arrangement is provided in the first torque transmission path for generating a phase shift of rotational irregularities conducted via the first torque transmission path relative to rotational irregularities conducted via the second torque transmission path, wherein the coupling arrangement comprises a coupling lever arrangement.

Whereas the coupling arrangement in the above-mentioned prior art comprises a planetary gear unit of comparatively complex construction, a guiding together of the torque components conducted via the two torque transmission paths is realized in the construction according to the present invention by means of a coupling lever arrangement. A lever arrangement of this type is constructed in a comparatively simple manner, yet is stable at the same time. Further, a lever arrangement has the advantage that when a lever in question is swiveled around a swiveling axis, its effective lever length generally changes. When this functionality is integrated in a coupling arrangement, the change in the effective lever lengths can be used to achieve an adaptation to different load conditions by changing the lever ratio and, therefore, also changing the gear ratio of the coupling lever arrangement.

In order to achieve the phase shift in a simple manner in one of the torque transmission paths, it is suggested that the phase shifter arrangement comprises a vibration system with a primary side and a secondary side which is rotatable with respect to the primary side around the axis of rotation against the action of a spring arrangement. A vibration system of this type can be constructed as a kind of vibration damper, known per se, in which the resonant frequency of the vibration system can be adjusted in a defined manner, particularly by influencing the primary-side mass and secondary-side mass as well as the stiffness of the spring arrangement, and the frequency at which there is a transition to the supercritical state can accordingly also be determined.

The coupling lever arrangement can comprise a connection lever carrier, and at least one connection lever is swivelably coupled to the connection lever carrier in a first connection lever coupling region. This connection lever carrier can be integrated, for example, in the second torque transmission path and can co-define the splitting between the first torque transmission path and second torque transmission path.

In order to bring together the torque components conducted via the two torque transmission paths so as to incorporate the at least one connection lever, it is further suggested that at least one connection lever be coupled to the secondary side of the vibration system in a second connection lever coupling region so as to be swivelable with respect to the secondary side of the vibration system and be coupled to the output region in a third connection lever coupling region so as to be swivelable with respect to this output region. The coupling of the at least one connection lever to the secondary side of the vibration system and/or to the output region can be realized directly, i.e., without the intermediary of further connection members, e.g., additional lever elements. Alternatively, it can be provided, particularly to compensate for circumferential relative movements of different coupling regions, that at least one drive lever is swivelably coupled with the secondary side of the vibration system in a first drive lever coupling region and is swivelably coupled in a second drive lever coupling region with a connection lever in the second connection lever coupling region thereof. The connection of the at least one connection lever coupling region to the output region can also be carried out indirectly on the driven side, namely, in that at least one driven lever is swivelably coupled with the output region in a first driven lever coupling region and is swivelably coupled with a connection lever in a second driven lever coupling region in the third connection lever coupling region of the connection lever.

To specify a gear ratio of the coupling lever arrangement, which gear ratio also influences the splitting of the torque components between the two torque transmission paths, it is suggested that for at least one connection lever the second connection lever coupling region and the third connection lever coupling region are at different distances from the first connection lever coupling region. Through the resulting lever lengths, the choice of respective distances affects the gear ratio of the lever arrangement acting as lever gear unit.

In this respect, it can be provided, for example, that the distance of the second connection lever coupling region from the first connection lever coupling region is greater than the distance of the third connection lever coupling region from the first connection lever coupling region. To enable further influencing of the gear ratio or lever ratios in operation also in a load-dependent manner, it is further suggested that for at least one connection lever a second connection lever coupling region and/or a third connection lever coupling region are/is movable, preferably against a pre-loading force, toward the first connection lever coupling region and/or away from the first connection lever coupling region.

A compact construction can be obtained in that the coupling lever arrangement is arranged at least partially radially outward or inward of the spring arrangement and/or is arranged so as to at least partially axially overlap the spring arrangement.

The arrangement of the vibration system makes it possible to influence the position of the resonant frequency thereof and, therefore, substantially also the transition to the supercritical state. To this end, it can be provided, for example, that the spring arrangement comprises a first spring set with spring units which are arranged successively in circumferential direction and which can be supported with respect to the primary side and to an intermediate mass and a second spring set with spring units which are arranged successively in circumferential direction and which can be supported with respect to the intermediate mass and the secondary side. Accordingly, there are essentially two vibration system regions acting in series in this case, each of which can ultimately be regarded as an independent partial vibration system constructed in each instance in the manner of a torsional vibration damper.

Further, it can be provided, for example, that the first spring set is arranged radially outward of the second spring set and/or is arranged so as to at least partially overlap the second spring set in axial direction. This radial staggering and, as the case may be, axial overlapping facilitates a compact construction.

In an alternative construction, it is suggested that the spring arrangement comprises a spring set with spring units which are arranged successively in circumferential direction and which can be supported with respect to the primary side and the secondary side.

BRIEF DESCRIPTION OF THE DRAWINGS

The present invention will be described in detail in the following with reference to the accompanying drawings in which:

FIG. 2 is a fragmentary longitudinal sectional view of the torsional vibration damping arrangement shown in FIG. 1, in section along the line II-II in FIG. 1;

FIG. 3 is a fragmentary longitudinal sectional view of the torsional vibration damping arrangement shown in FIG. 1, in section along the line III-III in FIG. 1;

FIG. 6 is a connection lever of the coupling lever arrangement shown in FIG. 5 with a drive lever and a driven lever;

FIG. 7 is a view corresponding to FIG. 6 of an alternative embodiment of a connection lever;

FIG. 14 is a longitudinal sectional view of the torsional vibration damping arrangement shown in FIG. 10, in section along the line XIV-XIV in FIG. 10;

FIG. 15 is a perspective view of a coupling lever arrangement of the torsional vibration damping arrangement shown in FIG. 10;

DETAILED DESCRIPTION OF THE PRESENTLY PREFERRED EMBODIMENTS

A first embodiment of a torsional vibration damping arrangement, designated generally by 10, which operates on the principle of power splitting or torque splitting will be described in the following with reference to FIGS. 1 to 6. The torsional vibration damping arrangement 10 can be arranged in a drivetrain, for example, of a vehicle, between a drive unit, i.e., for example, an internal combustion engine, and the subsequent portion of the drivetrain, i.e., for example, a friction clutch, a hydrodynamic torque converter or the like.

Figure 1:
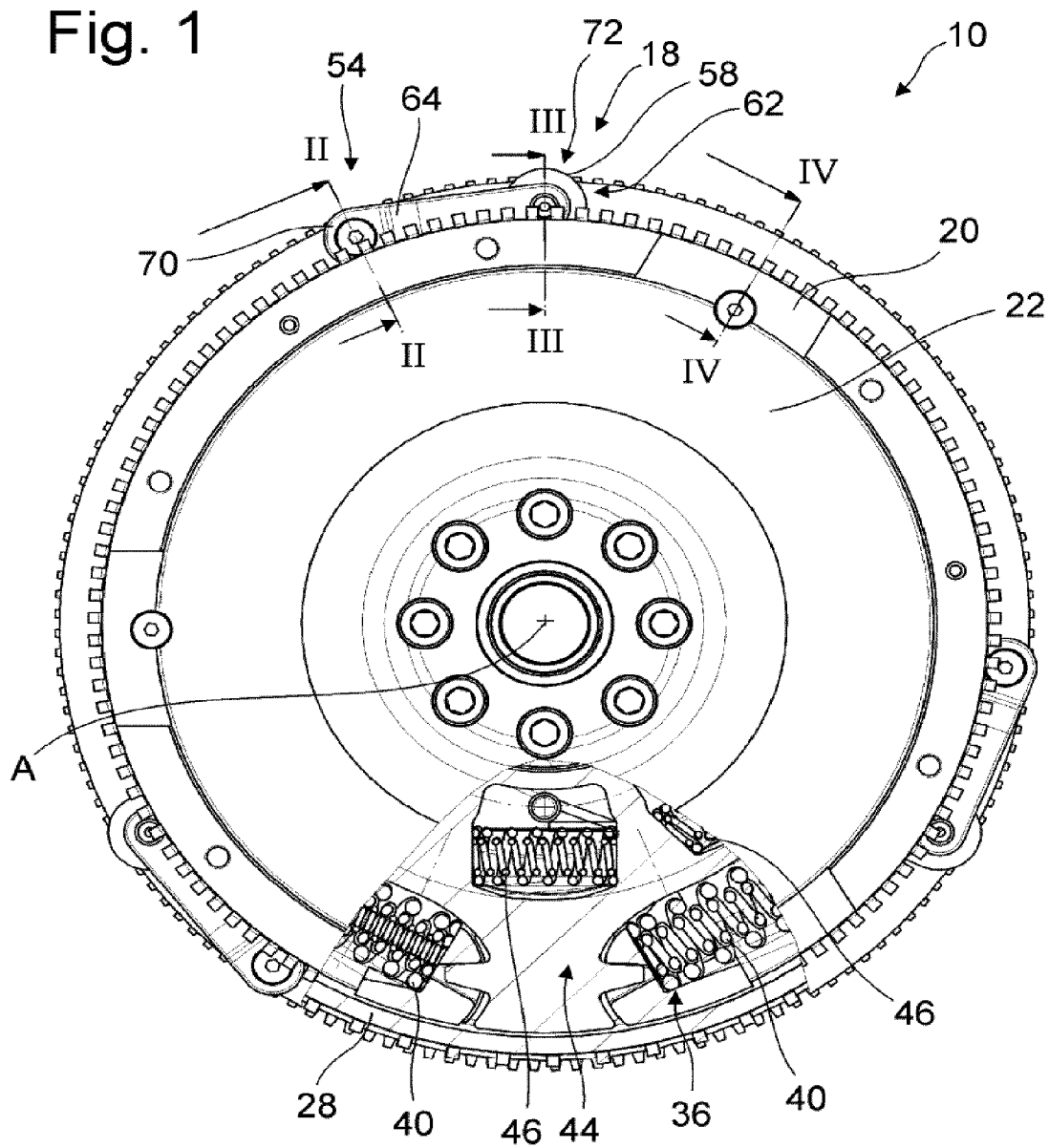
FIG. 1 is an axial view of a torsional vibration damping arrangement in a first embodiment, partly in section.
Figure 4:
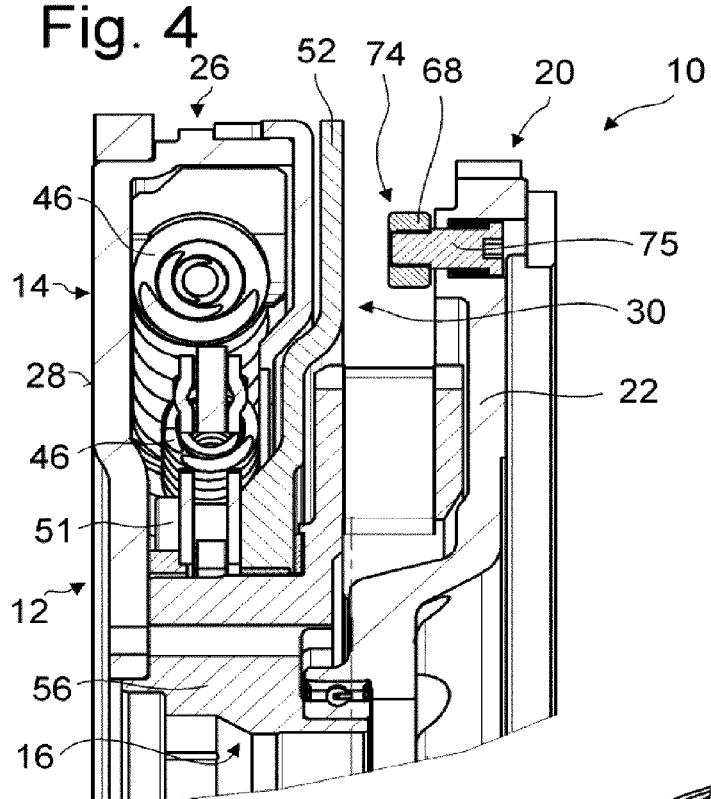
FIG. 4 is a fragmentary longitudinal sectional view of the torsional vibration damping arrangement shown in FIG. 1, in section along the line IV-IV in FIG. 1.

The torsional vibration damping arrangement 10 shown in longitudinal section in FIGS. 2 to 4 comprises an input region, indicated generally by 12. This input region 12 can be connected, for example, screwed, to a crankshaft of an internal combustion engine. In the input region 12, the torque received from a drive unit branches into a first torque transmission path 14 and a second torque transmission path 16. In the region of a coupling arrangement, indicated generally by 18, the torque components conducted via the two torque transmission paths 14, 16 are brought together again and then conveyed to an output region 20 which comprises a flywheel 22 of a friction clutch in the depicted example.

A vibration system, indicated generally by 24, is integrated in the first torque transmission path 14. The vibration system 24 acts as a phase shifter arrangement 26 and comprises a primary side 28 which is to be connected, for example, to the drive unit and a secondary side 30 conveying the torque. The primary side 28 is constructed with two cover disk elements 32, 34. These cover disk elements 32, 34 substantially completely enclose a spatial region toward the radially outer side, a first spring set 36 of a spring arrangement, designated generally by 38, being received in this spatial region. The first spring set 36 comprises a plurality of spring units 40 which are arranged successively in circumferential direction and also possibly so as to be nested one inside the other. Each spring unit 40 preferably comprises at least one helical pressure spring. The spring units 40 of the first spring set 36 are supported with respect to the primary side 28 on the one hand and with respect to an intermediate mass 42 formed as center disk on the other hand. A second spring set 44 is arranged radially inward of the first spring set 36. This second spring set 44 also comprises a plurality of spring units 46 which are arranged successively in circumferential direction and possibly so as to be nested one inside the other, each spring unit 46 preferably being formed with at least one helical pressure spring. The spring units 46 of the second spring set 44 are supported with respect to the intermediate mass 42 formed as center disk on the one hand and with respect to two cover disk elements 48, 50 arranged at both sides of the latter on the other hand. These two cover disk elements 48, 50 in conjunction with a disk part 52 fixedly connected thereto, for example, by screw bolts 51, substantially form the secondary side of the vibration system 24.

It will be seen from the foregoing description that the vibration system 24 comprises two vibration system regions which are radially nested one inside the other and which overlap one another substantially completely in axial direction, each of which is formed in the manner of a torsional vibration damper. The primary side of the first vibration system region with respect to the torque path, which first vibration system region comprises the first spring set 36, also essentially forms the primary side 28 of the vibration system 24, while the secondary side of the second vibration system region in the torque path, which second vibration system region comprises the second spring set 44, essentially forms the secondary side 30 of the vibration system 24. It is possible to place the resonant frequency of the vibration system 24 in a desired range through the choice of masses of the primary side 28, secondary side 30 and intermediate mass 42 and also through the choice of the stiffnesses of the spring sets 36, 44.

It should be noted here that, of course, the vibration system 24 can also be formed with only one individual spring set; that is, the spring arrangement 38 can have only one spring set in which a plurality of spring units are then arranged successively in circumferential direction.

Figure 5:
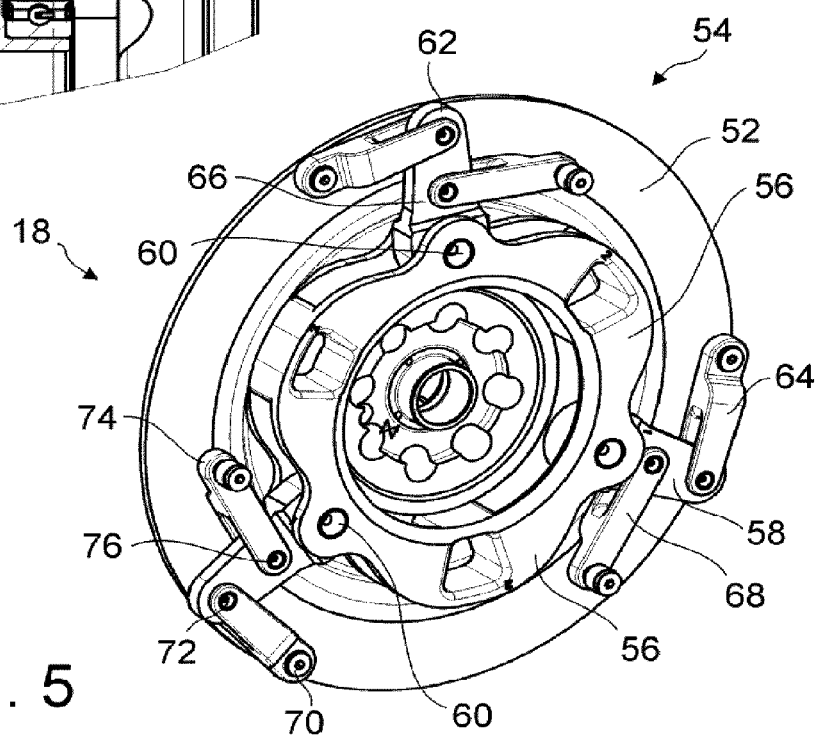
FIG. 5 is a perspective view of a coupling lever arrangement of the torsional vibration damping arrangement shown in FIG. 1.

The coupling arrangement 18 of the torsional vibration damping arrangement 10 is formed as a coupling lever arrangement 54. As is shown in FIGS. 5 and 6, the coupling lever arrangement comprises a ring-shaped connection lever carrier 56 whose radially inner area axially overlaps the vibration system 24 and which is fixedly connected to the primary side 28 by screws or is screwed together with the primary side 28, e.g., to a crankshaft. In the depicted example, three connection levers 58 are swivelably supported at the connection lever carrier 56 in a respective first connection lever region 60 at an angular distance of 120°. To this end, the connection levers 58 can be inserted by their radially inner region into corresponding cutouts of the connection lever carrier 56 and swivelably coupled with the connection lever carrier 56 by means of swivel pins 63 or the like. In a radially outer region, the connection levers 58 have a second connection lever coupling region 62 in which the connection levers 58 are swivelably coupled by swivel pins 65 with a drive lever 64 which extends approximately in circumferential direction. The connection levers 58 have a third connection lever coupling region 66 between the first connection lever coupling region 60 and the second connection lever coupling region 62. A driven lever 68 is swivelably coupled with the connection lever 58 by means of a swivel pin 69 in each instance.

In a respective first drive lever coupling region 70, the drive levers 64 are swivelably coupled by swivel pins 71 to the disk part 52 which is connected to or included in the secondary side 30. In its other circumferential region, the drive levers 64 have a second drive lever coupling region 72 in which they are swivelably coupled to the respectively associated connection lever 58 in the second connection lever coupling region 62 thereof by means of the swivel pins 65.

In their circumferential end region remote of the connection lever 58, the driven levers 68 have a first driven lever coupling region 74. The driven levers 68 are swivelably coupled to the output region 20, i.e., for example, flywheel 22, in this first driven lever coupling region 74 by means of swivel pins 75. In their end region near the connection lever 58, the driven levers 68 have a second driven lever coupling region 76, where the driven levers 68 are swivelably coupled with the associated connection lever 58 in the third connection lever coupling region 66 thereof by means of swivel pins 69.

It can be seen particularly in FIG. 6 that the drive levers 64 and driven levers 68 are fork-shaped, respectively, and accordingly engage around the connection lever in the second connection lever coupling region 62 and third connection lever coupling region 66 thereof, respectively, in a fork-like manner. To prevent friction effects, the coupling of the different levers, i.e., connection lever 58, drive levers 64 and driven levers 68, to one another and to other assemblies can be carried out using swivel pins, rolling bearings or plain bearings. The swiveling coupling can be carried out using swivel pins, a respective screw connection, rivet connection or press-fit stem. In principle, the different levers should be able to swivel with respect to the structural component parts coupled with them with as little friction as possible in the required swiveling angle range.

In torque transmission operation, the torque transmitted into the input region is transmitted via the two torque transmission paths 14, 16. The torque components respectively conducted via these torque transmission paths 14, 16 are united again in the region of the coupling arrangement 18. A static torque, i.e., a torque having no irregularities or no vibrations superposed thereon, in principle will not lead to an oscillating relative motion between the primary side 28 and the secondary side 30 of the vibration system 24. This means that the connection lever carrier 56 and the disk part 52 will also not carry out an oscillating relative movement with respect to one another. However, due to the torque component conducted via the first torque transmission path 14, a compression of the spring units 40, 46 is brought about, which results in a swiveling of the connection lever 58 around its respective first connection lever coupling region 60 at the connection lever carrier 56 corresponding to the magnitude of the static torque to be transmitted. This means that the connection levers 58 are swiveled into a position corresponding to the load condition, for example, proceeding from an approximately radial orientation of the connection levers 58 with respect to an axis of rotation A of the torsional vibration damping arrangement 10 in the unloaded condition. The connection levers 58 remain in this swiveling position as long as no oscillating torque is superposed on the static torque.

As a result of the oscillations of the torque which are superposed on the static torque and which are inevitable on principle when using an internal combustion engine, the connection levers will oscillate around the above-mentioned swiveling position that is assumed depending on the load condition or depending on the static torque to be transmitted because the primary side 28 of the vibration system 24 and, along with the latter, the components of the second torque transmission path 16 will carry out an oscillating movement with respect to the secondary side 30. Ideally, these two system areas oscillate out of phase with one another in the supercritical state of the vibration system 24, which causes the connection levers 58 to swivel back and forth approximately around their respective third connection lever coupling region 66 regardless of the rotational movement taking place in principle around the axis of rotation A. Referring to FIG. 6, for example, this means that during a leftward movement of the second connection lever coupling region 62, i.e., in counterclockwise direction, brought about by the oscillating motion, the first connection lever coupling region 60 will move rightward, i.e., in clockwise direction, while the third connection lever coupling region 66 essentially maintains its position as was already mentioned but, of course, with the basic rotational movement superposed on it. As a result of this, the torque combined in the connection levers 58 is introduced via the third connection lever coupling regions 66 or second driven lever coupling regions 76 into the driven levers 68 as a total torque with essentially no oscillation. By specifying the radial position of the third connection lever coupling region 66 between the first connection lever coupling region 60 and the second connection lever coupling region 62, it is possible to adjust the gear ratio of the coupling lever arrangement 18 and, therefore, to adjust the splitting of the torque components between the first torque transmission path 14 and the second torque transmission path 16. In this regard, it must be taken into consideration that a damping of rotational irregularities or torque oscillations will basically already occur due to the presence of the vibration system 24 in the first torque transmission path 14, so that the gear ratio can be selected in such a way that the larger torque component is introduced into the first torque transmission path 14 so that after the damping already taking place in the vibration system 24 the torque component introduced into the secondary side 30 in a phase-shifted manner corresponds approximately to the torque component introduced into the second torque transmission path 16 in terms of its amplitude.

A gear ratio of the coupling lever arrangement greater than 1 is achieved by means of the depicted position of the third connection lever coupling region 66 between the first connection lever coupling region 60 and the second connection lever coupling region 62. This causes the torque introduced into the input region to be divided in such a way that the larger torque component is introduced into the first torque transmission path 14 and the smaller torque component is introduced into the second torque transmission path 16. This ensures that there can be rotational irregularities with approximately the same amplitude after the damping of rotational irregularities in the vibration system 24 on the secondary side 30 on the one hand and in the second torque transmission path 16 on the other hand.

The closer the gear ratio is to 1, the larger the torque component conducted via the first torque transmission path 14. With a gear ratio of 1, the entire torque would essentially be conducted via the first torque transmission path. At a gear ratio below 1 (the second connection lever coupling region lies closer to the first connection lever coupling region than the third connection lever coupling region), a reversal of the torque flow would take place in the second torque transmission path 16 accompanied by support at the coupling lever arrangement 54, which would lead to a corresponding torque increase in the first torque transmission path 14.

At a gear ratio greater than 1, the deflection of the connection levers 58 in the pull condition referring to FIG. 6, e.g., in clockwise direction, which is brought about as a result of the static torque in the loaded state causes the gear ratio to decrease, i.e., to approach the value of 1, as a result of the swiveling of the connection levers 58 in the loaded state, which swiveling is brought about, for example, proceeding from an approximately radially extending position of the connection levers 58. However, a decreasing gear ratio causes an increasing torque component in the first torque transmission path 14 so that the damping characteristic of the vibration system 24 itself can be exploited to a greater extent as the load increases.

The swiveling of the connection levers 58 brought about in the loaded state and the consequent change in the gear ratio depend on the direction in which the connection levers 58 swivel proceeding from their swiveling position in unloaded condition with respect to the connection lever carrier 56. The swiveling in a first swiveling direction brought about in the pull state leads to an approximation of the gear ratio to the value of 1 from above and therefore to an increase in the torque component conducted via the first torque transmission path 14. The swiveling of the connection levers 58 brought about in an opposite, second swiveling direction in the push state can lead to an increase in the gear ratio, i.e., upward away from the value of 1, which on principle leads to a decrease in the torque component conducted via the first torque transmission path 14. Since the occurrence of rotational irregularities is less critical in the push state, particularly also because an internal combustion engine is generally not operated under high load in the push state, the reduction in the torque component conducted via the first torque transmission path is basically not critical for the damping characteristic of the torsional vibration damping arrangement 10.

Further, as a result of the above-mentioned load-dependent deflection of the connection levers 58 due to the static torque or total torque to be transmitted, a load-dependent change in the effective lever lengths and, therefore, in the gear ratio of the coupling lever arrangement 18 is achieved. As a result, the splitting of the torque components introduced into the two torque transmission paths 14, 16 likewise changes in a load-dependent manner so that the vibration damping characteristic of the torsional vibration damping arrangement 10 according to the invention is advantageously adapted to the torque to be transmitted.

Figure 8:
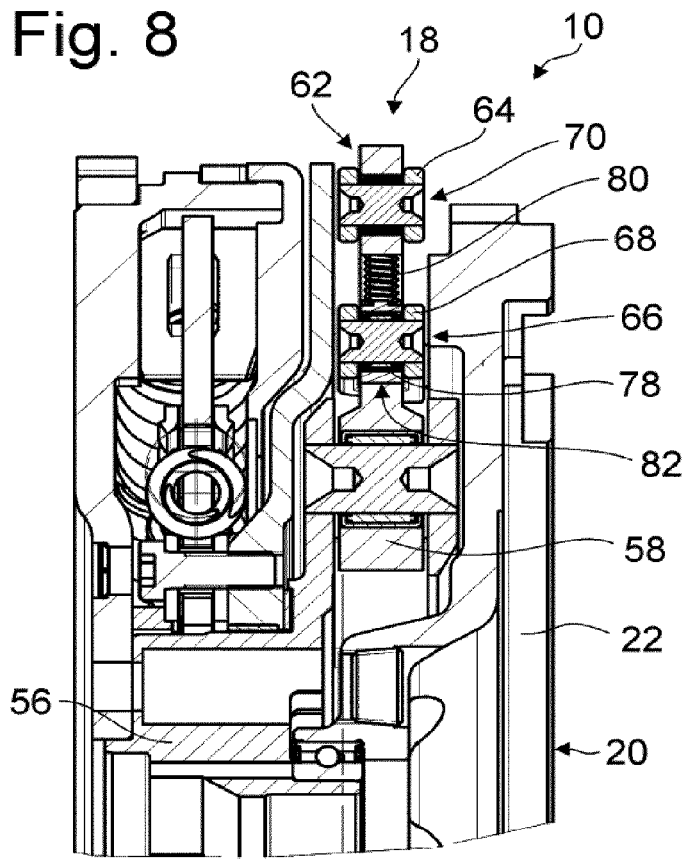
FIG. 8 is a longitudinal sectional view of a torsional vibration damping arrangement according to FIG. 1 with a connection lever shown in FIG. 7.
Figure 9:
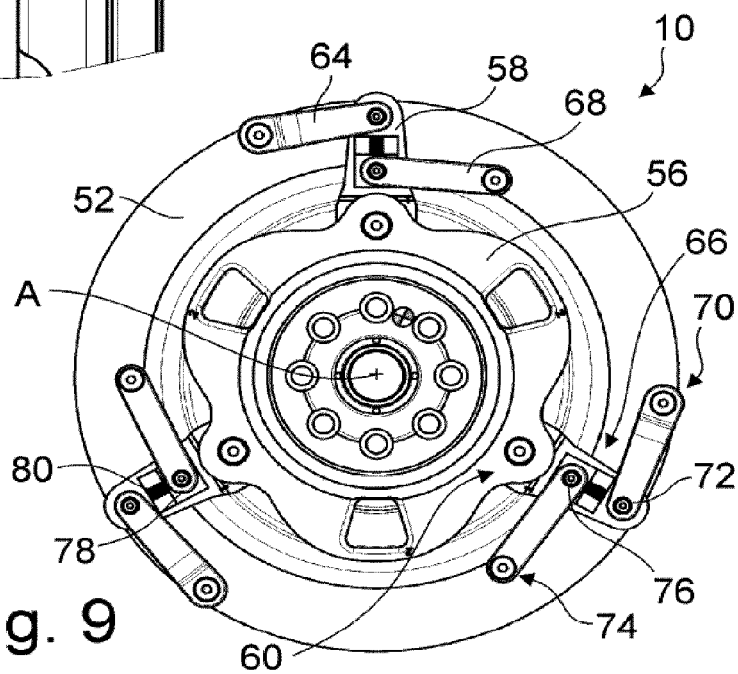
FIG. 9 is an axial view of a coupling lever arrangement with connection levers according to FIG. 7.
Figure 10:
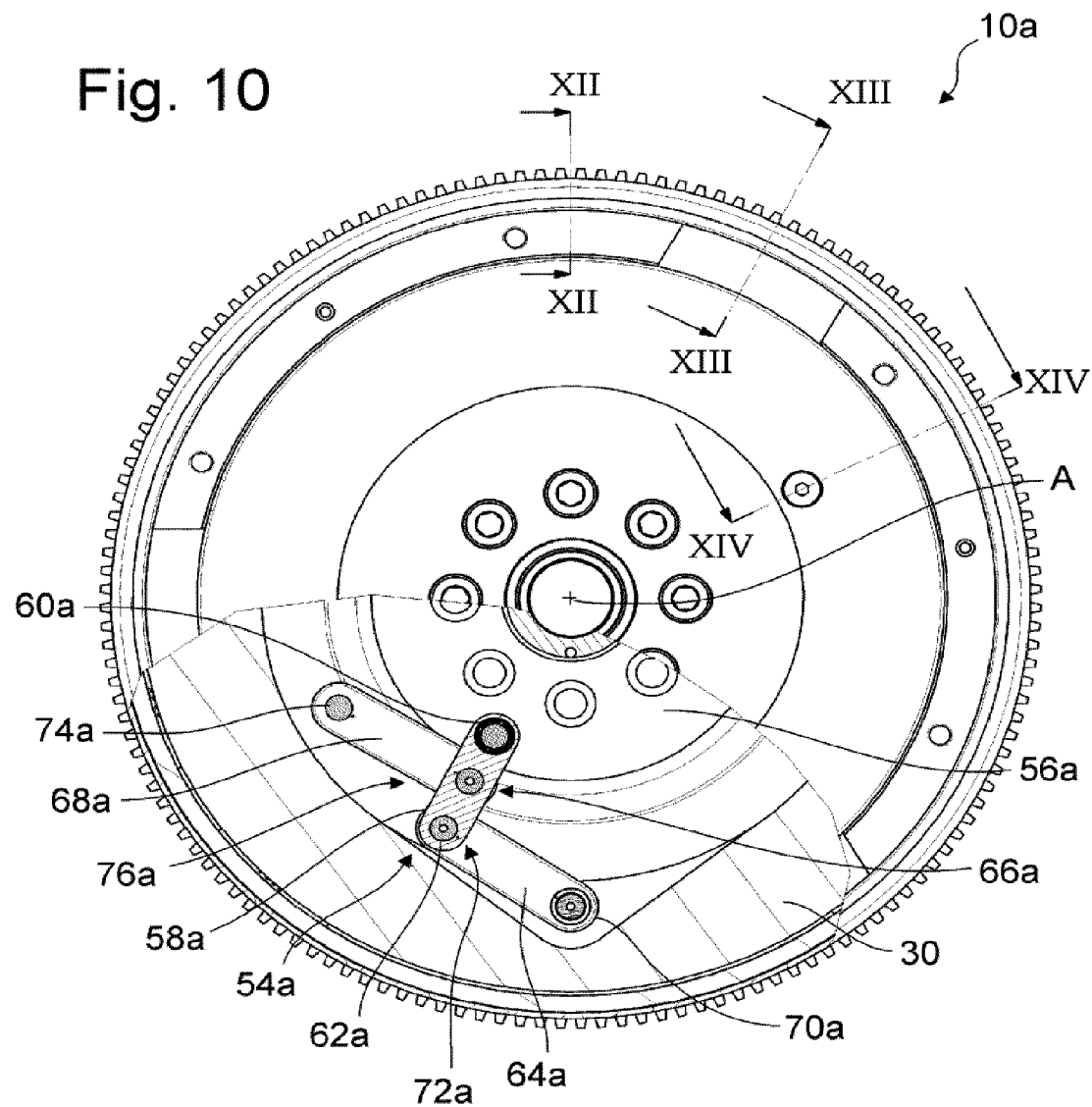
FIG. 10 is an axial view corresponding to FIG. 1 of an alternative embodiment of a torsional vibration damping arrangement.
Figure 11:
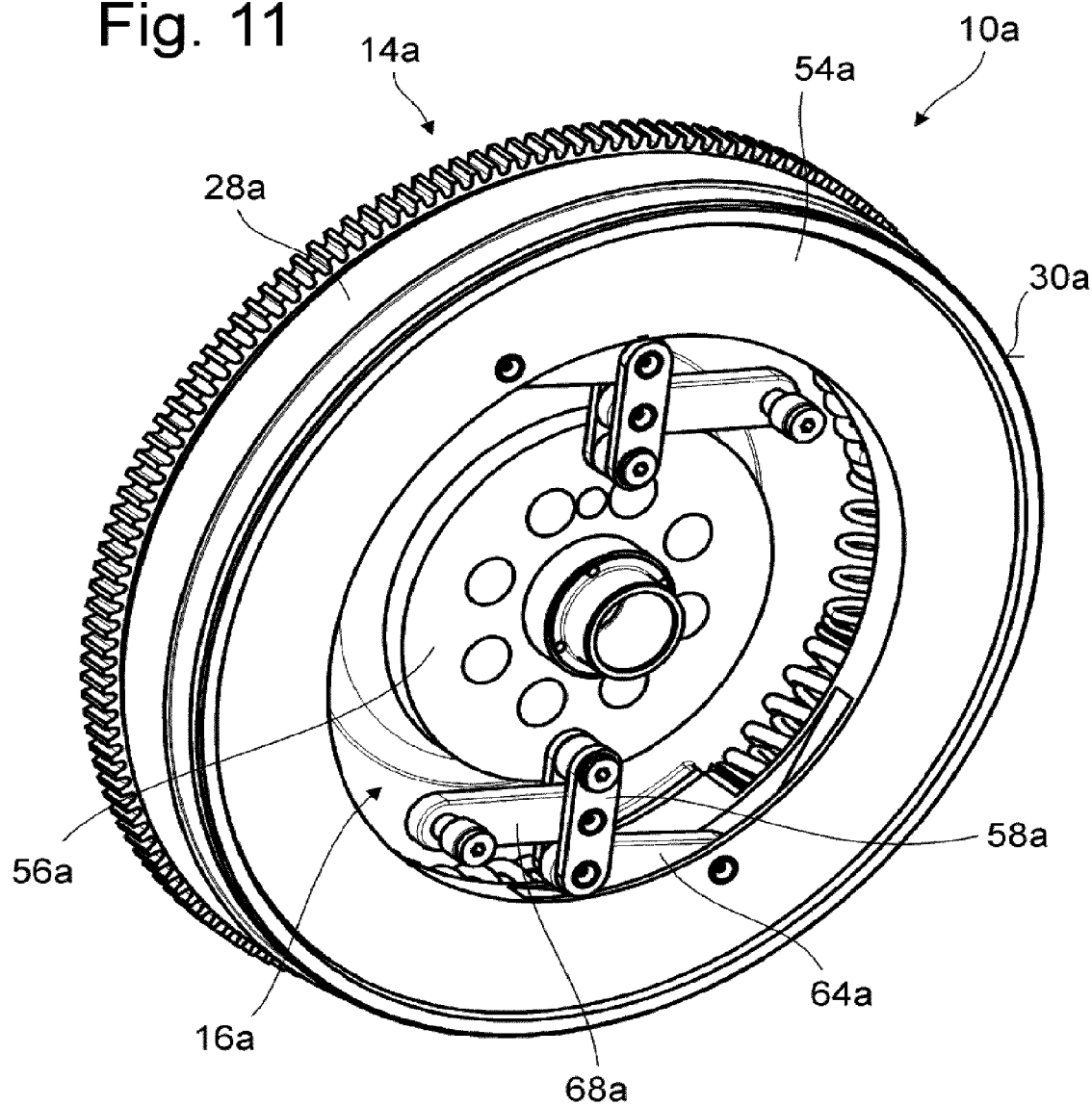
FIG. 11 is a perspective view of the torsional vibration damping arrangement shown in FIG. 10.

A further possibility for adapting the damping behavior to the load condition is shown in FIGS. 7 to 9. It will be seen that the driven levers 68 in this embodiment are swivelably coupled to a coupling element 78 of the respective connection lever 58 by their second driven lever coupling region 76. The coupling element 78 can be displaceable in a cutout of the connection lever 58 in direction between the first connection lever coupling region 60 and the second connection lever coupling region 62. A preloading spring 80 which is supported at the connection lever 58 near the second connection lever coupling region 62 preloads the coupling element 78 in direction of a shoulder 82 near the first connection lever coupling region 60, i.e., in direction of the first connection lever coupling region 60. This means that the third connection lever coupling region 66 is movable in principle between the first connection lever coupling region 60 and the second connection lever coupling region 62, but is to be preloaded in direction of the first connection lever coupling region 60.

Depending upon the load and possibly also on the rotational speed, the coupling element 78 can move against the preloading action of the preloading spring 80 in direction away from the first connection lever coupling region 60 toward the second connection lever coupling region 62 so that the effective lever length of the connection lever 58 also increases between the first connection lever coupling region 60 and the third connection lever coupling region 66. This produces a change in the gear ratio of the coupling lever arrangement 18 and, therefore, a variation in the damping characteristic of the torsional vibration damping arrangement 10.

As can be seen from FIG. 9, it possible to vary the effective lever lengths not only depending upon load but also depending upon rotational speed. Because of the centrifugal force occurring in rotational operation, a respective coupling element 78 can be displaced radially together with the third connection lever coupling region 66, which is swivelably supported thereon, depending on the preloading action of the associated preloading spring 80 so that the radial distance between a respective first connection lever coupling region 60 and third connection lever coupling region 66 varies depending on rotational speed, namely, increasingly as the rotational speed increases.

Because of the displacement of the coupling element 78 radially outward, which is brought about and made possible depending on load or rotational speed, the third connection lever coupling region 66 approaches the second connection lever coupling region 62, as a result of which the gear ratio approaches the value of 1. If an arrangement in which the gear ratio is greater than 1, i.e., in which the larger torque component is guided via the first torque transmission path 14, is chosen in the unloaded condition, the load-dependent or speed-dependent displacement of the third connection lever coupling region 66 leads to a decrease in the gear ratio and therefore to an approximation of the value of 1. This also causes an increase in the torque component guided via the first torque transmission path 14 so that the damping functionality of the vibration system 24 can be made use of again to an increased extent in a state of higher load or higher rotational speed. The effect whereby the third connection lever coupling region 66 approaches the second connection lever coupling region 62, which takes place in opposition to the preloading of the springs, can overlap with the change in the gear ratio brought about by the swiveling of the connection levers 58 in the loaded condition so that an even better adaptation to different load conditions and rotational speed states can be achieved.

An alternative embodiment form of a torsional vibration damping arrangement constructed according to the invention will be described in the following referring to FIGS. 10 to 16. Components whose function or construction corresponds to that of the components described above are designated by the same reference numerals to which an "a" is appended.

Figures 12, 13:
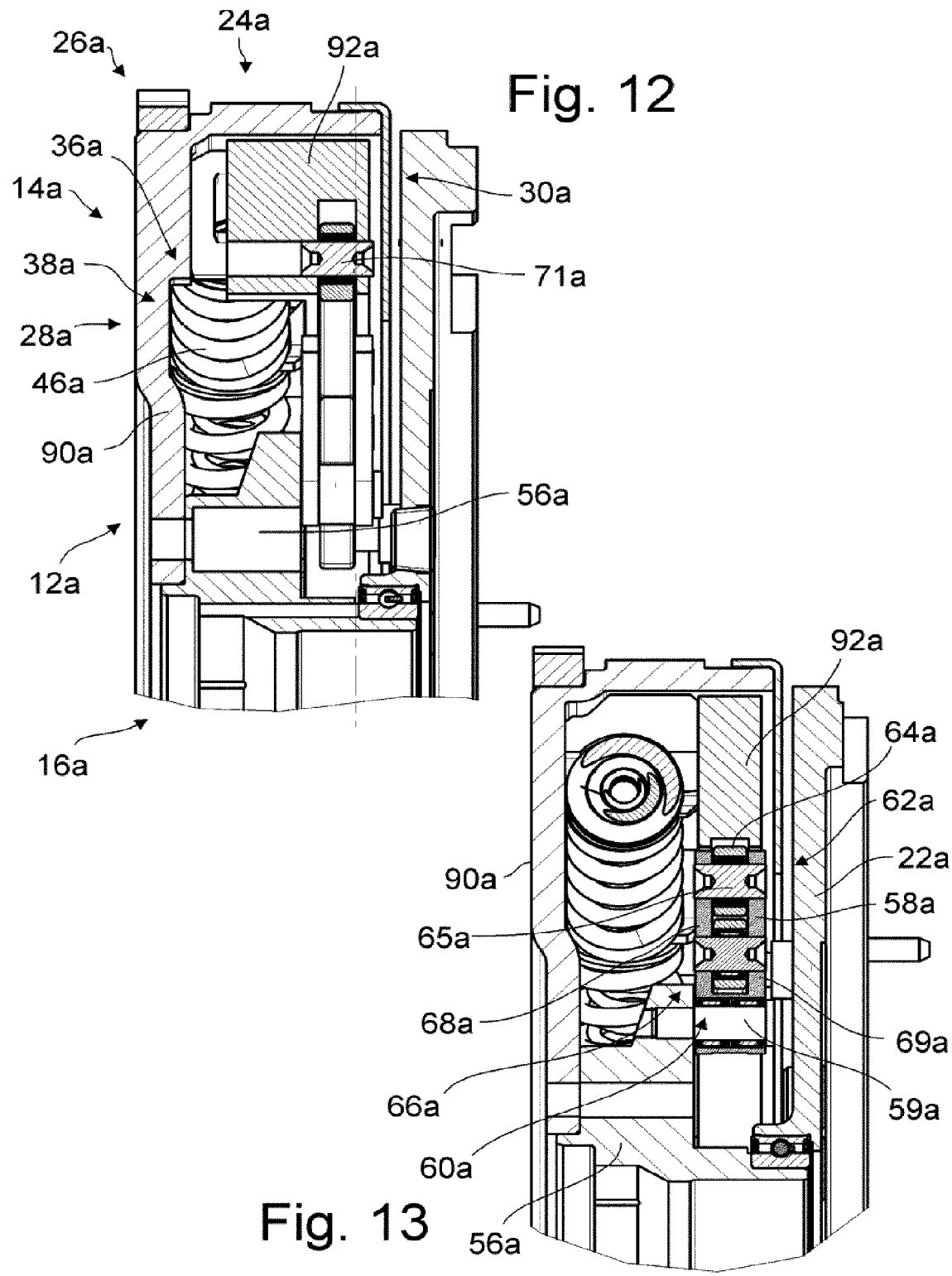
FIG. 12 is a longitudinal sectional view of the torsional vibration damping arrangement shown in FIG. 10, in section along the line XII-XII in FIG. 10.
FIG. 13 is a longitudinal sectional view of the torsional vibration damping arrangement shown in FIG. 10, in section along the line XIII-XIII in FIG. 10.
Figure 16:
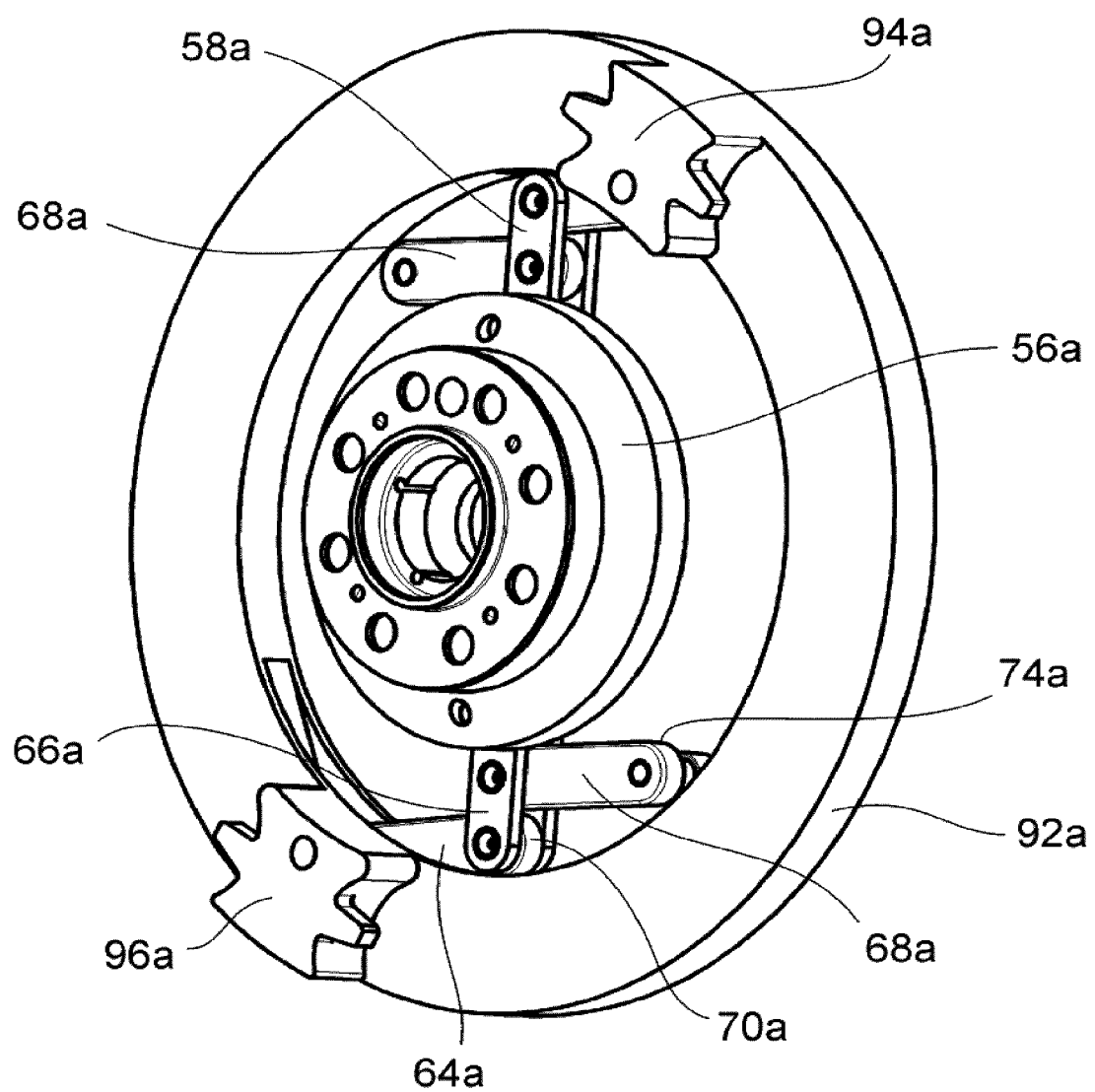
FIG. 16 is another perspective view of the coupling lever arrangement of the torsional vibration damping arrangement shown in FIG. 10.

In this embodiment form a difference in construction consists primarily in the arrangement of the vibration system 24a acting as phase shifter arrangement 26a. As is shown in FIGS. 12 to 14, for example, the primary side 28a of the vibration system comprises a disk element 90a which is to be secured in its radially inner region together with the connection lever carrier 56 to a driveshaft, e.g., crankshaft, by means of screw bolts or the like. The secondary side 30a comprises a further structural component part 92a which is constructed as an annular disk and which is arranged axially opposite the disk element 90a of the primary side 28a. The disk element 90a and the structural component part 92a have circumferential support regions for the spring units 46a of the spring set 36a of the spring arrangement 38a, which circumferential support regions are associated with one another and complement one another. It should be noted here that in this embodiment form the vibration system has only one vibration system region, i.e., one spring set 36a, and the second spring set and intermediate mass which are provided in the embodiment form described above are therefore absent in this case. The circumferential support regions 94a, 96a of the secondary-side structural component part 92a are clearly shown in FIGS. 15 and 16.

The drive levers 64a of the coupling lever arrangement 54a which comprise two connection levers 58a in this case are swivelably coupled in their first drive lever coupling regions 70a with the secondary-side structural component part 92a in respective cutouts 96a by means of swiveling pins 71a. The connection levers 58a formed with two disk parts at a distance from one another are swivelably coupled in their radially inner first connection lever coupling region 60a with the connection lever carrier 56a by means of swiveling pins 59a and swivelably support the second drive lever coupling regions 72a in their second connection lever coupling region 62a which is positioned on the radially outer side. Arranged therebetween are the third connection lever coupling regions 66a to which the drive levers 68a are swivelably coupled in turn by their respective second driven lever coupling region 76a.

The functional characteristics of this embodiment form of the torsional vibration damping arrangement 10 with respect to the division and superposition of the torque components correspond to the embodiment form which is described above with reference to FIGS. 1 to 9 and this description can be referred to.

If the vibration system 24a is formed with only one spring set 36a as is shown in FIGS. 10 to 16, it is possible in principle to arrange the individual spring set either comparatively farther radially outward or farther radially inward. When arranged farther radially outward, a larger spring volume is possible, although this takes up more installation space for the spring units 40 of the spring set 36a. Positioning on the radially outer side also allows the driven-side structural component part 92a not to be positioned in such a way that it is also located axially opposite the disk element 90a of the primary side 28a with respect to the supporting functionality but rather to be positioned, for example, radially inward of the spring units 40a and to have supporting regions which engage radially outwardly. However, this results in a reduced secondary-side mass moment of inertia which must be compensated in this case by an additional mass to be connected to the secondary side 30a. When the spring units 40a are located farther radially inward, there is also less friction force because the centrifugal forces acting on the spring units 40a are correspondingly smaller; this reduced friction force can result in an improved decoupling quality and, therefore, in a more pronounced transition to the supercritical state with a phase shift of up to 180°. This transition is reached more quickly after passing through the resonant frequency. Positioning the spring units 40a farther radially inward makes it possible to arrange the coupling lever arrangement 56a radially outward of the spring set 36a and, for example, so as to substantially completely overlap axially with the latter, which can be conducive to a comparatively short axial structural length.

Figure 17:
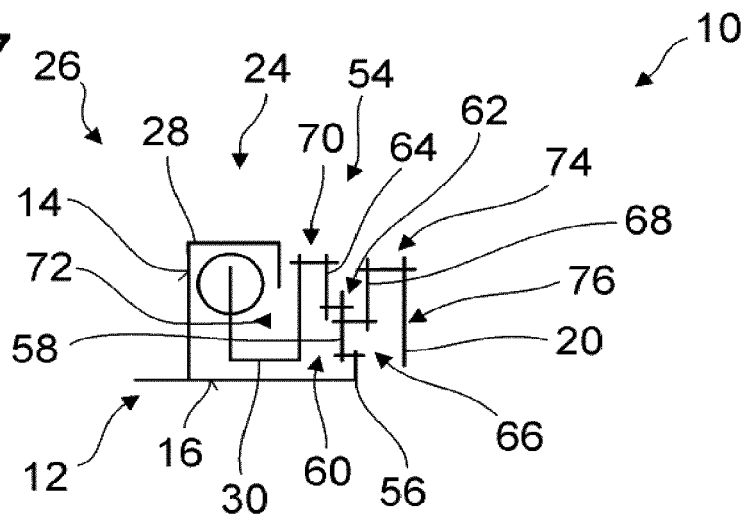
FIG. 17 is a schematic diagram illustrating the construction and operating principle of a torsional vibration damping arrangement according to FIGS. 1 to 16.

Different possible basic variations, particularly in the construction of the coupling lever arrangement 54, will be described in the following with reference to FIGS. 17 to 19. FIG. 17 shows the construction which was described in principle above with reference to FIGS. 1 to 16 in which the drive levers 64 are articulated by their first drive lever coupling region 70 to the secondary side 30 of the vibration system 24 and the connection levers 58 are supported by their first connection lever coupling region at a coupling lever arrangement 56 which also extends radially inward of the vibration system 28.

Figure 18:
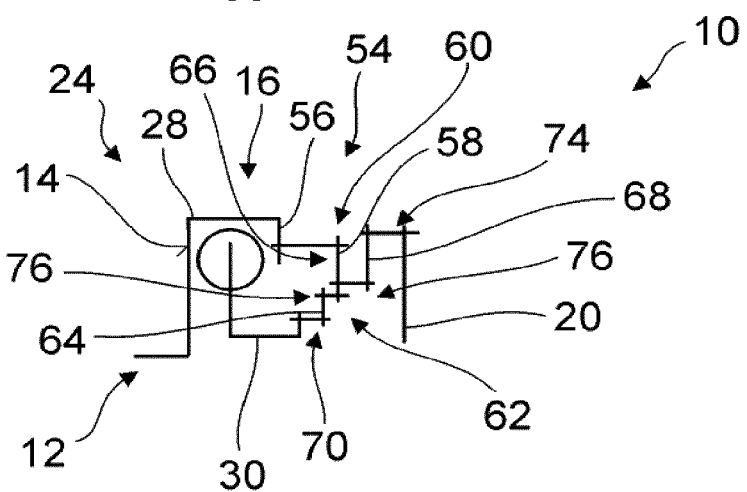
FIG. 18 is a schematic diagram corresponding to FIG. 17 with another constructional arrangement.

A variation is shown in FIG. 18. It will be seen in this case that the connection lever carrier 56 is provided by the primary side 28, for example, with a cover disk element or the like. In this case, a branching into the first torque transmission path 14 leading to the secondary side 30 via the spring units or the spring set(s) and into the second torque transmission path 16 leading to the output region 20 via the connection lever 58 actually takes place in this region. These connection levers 58 are articulated to the connection lever carrier 56, i.e., for example, the primary side 28, by their first connection lever coupling region 60. The drive levers 64 are articulated at the secondary side 30 by their first drive lever coupling region 70. In this case, the arrangement could also be carried out in principle in such a way that the connection levers 58 are positioned so as to extend radially inward proceeding from their first connection lever coupling region 60 and with their second connection lever coupling region 62 accordingly radially inside their third connection lever coupling region 66.

Figure 19:
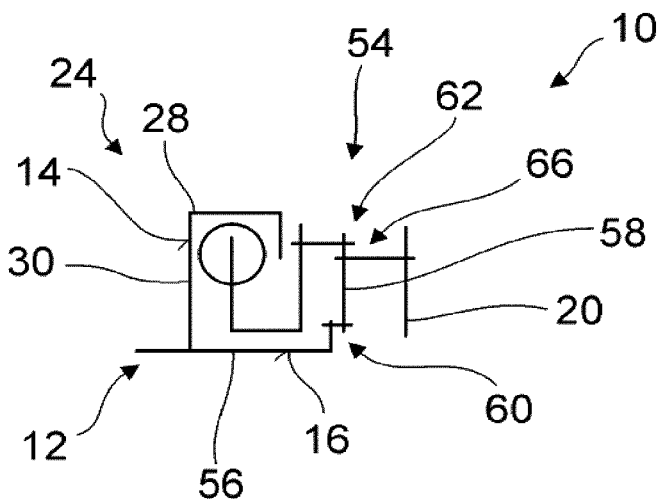
FIG. 19 is a schematic diagram corresponding to FIG. 17 with another constructional arrangement.

Another variation is shown in FIG. 19. It will be seen in this case that the coupling lever arrangement 54 only comprises connection levers 58. These connection levers 58 are swivelably supported at the connection lever carrier 56 in their first connection lever coupling region 60. This connection lever carrier 56 could also be constructed as in FIG. 18. The connection levers 58 are swivelably coupled by their second connection lever coupling region 62 directly to the secondary side 30 of the vibration system 24 without drive levers being positioned therebetween. The connection levers 58 are swivelably coupled by their third connection lever coupling region 66 directly to the output region 20 without the intermediary of driven levers. In this case, to allow the required change in distance between the first connection lever coupling region 60, second connection lever coupling region 62 and third connection lever coupling region 66 in the loaded condition or oscillating state, the swivelable connection to the secondary side 30 or to the output region 20 can be realized in the form of a coupling pin which is displaceable in an elongated hole in the connection lever 58 and/or the secondary side 30 or in the output region 20. In this case it must be taken into account that the radial distance of the respective connection lever coupling regions with respect to the axis of rotation A remains the same during the swiveling of the connection levers 58. The circumferential distance of the connection lever coupling regions must be allowed to vary. In principle, this displaceability or movability of the connection lever coupling regions can also be carried out against the preloading action of a preloading spring or the like as is shown in FIG. 7. It will be further noted with respect to the principle illustrated in FIG. 19 that, of course, only the driven levers or only the drive levers can be omitted compared to the embodiment forms described above.

In conclusion, it should be noted that a variety of variations can be carried out in the construction described above without deviating from the principles of the present invention. For instance, the quantity of connection levers provided in the coupling lever arrangement can also be varied, of course, depending on the torques occurring in the loaded condition. The connection levers and driven levers can also be fork-shaped or can be provided with a plurality of disk parts or the like depending on the anticipated loads. It also goes without saying that a variety of variations are possible in the area of the vibration system, which variations are also known, for example, from the field of torsional vibration dampers as in dual mass flywheels, hydrodynamic torque converters or the like. As was set forth above, the vibration system can have a plurality of stages, i.e., can be formed with a plurality of vibration system areas acting in series as is shown in FIGS. 1 to 9, or one stage, i.e., with only one vibration system area as is shown in FIGS. 10 to 16. Of course, friction mechanisms can be associated with the vibration system if required or advantageous in order to also generate friction effects depending upon load, for example. It is also possible in principle for a vibration system whose inherent frequency should not correspond to the inherent frequency of the vibration system to be integrated in the second torque transmission path 16 so that a transition to the supercritical state occurs at different rotational speeds. This makes it possible to define different regions with different phase displacement so that the damping characteristics can be additionally influenced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement, particularly for the drivetrain of a vehicle, comprising:
   an input region (12; 12a) driveable about an axis of rotation (A);
   an output region (20; 20a);
   between said input region (12; 12a) and said output region (20; 20a) a first torque transmission path (14, 16; 14a, 16a) and a second torque transmission path (16; 16a) parallel to said first torque transmission path (14, 16; 14a, 16a) for conducting torques via said torque transmission paths;

a coupling arrangement (18; 18a) between said input region and said output region for superposing said torques conducted via said torque transmission paths;

a phase shifter arrangement (26; 26a) in the first torque transmission path (14; 14a) for generating a phase shift of rotational irregularities conducted via said first torque transmission path (14; 14a) relative to rotational irregularities conducted via said second torque transmission path (16; 16a); and wherein said coupling arrangement (18; 18a) comprises a coupling lever arrangement (54; 54a) constructed for accommodating relative rotational movement between said input region and said output region.

2. The torsional vibration damping arrangement according to claim 1, additionally comprising a spring arrangement (38; 38a); and wherein said phase shifter arrangement (26; 26a) comprises a vibration system (24; 24a) having a primary side (28; 28a) and a secondary side (30; 30a) which is rotatable with respect to said primary side (28; 28a) around the axis of rotation (A) against the action of said spring arrangement (38; 38a).

3. The torsional vibration damping arrangement according to claim 2, wherein said coupling lever arrangement (54; 54a) is arranged at least partially radially outward or inward of said spring arrangement (38; 38a) and/or is arranged so as to at least partially axially overlap said spring arrangement.

4. The torsional vibration damping arrangement according to claim 2, wherein said spring arrangement (38) comprises an intermediate mass (42) and a first spring set (36) with spring units (40) arranged successively in circumferential direction and which can be supported with respect to said primary side (38) and to said intermediate mass (42) and a second spring set (44) with spring units (46) arranged successively in circumferential direction and which can be supported with respect to said intermediate mass (42) and said secondary side (30).

5. The torsional vibration damping arrangement according to claim 4, wherein said first spring set (36) is arranged radially outward of said second spring set (44) and/or is arranged so as to at least partially overlap said second spring set (44) in an axial direction.

6. The torsional vibration damping arrangement according to claim 2, wherein said spring arrangement (38) comprises a spring set (36) with spring units (40) which are arranged successively in circumferential direction and which can be supported with respect to said primary side (28) and said secondary side (30).

7. The torsional vibration damping arrangement according to claim 2, wherein said coupling lever arrangement (54; 54a) comprises a connection lever carrier (56; 56a) having a first connection lever coupling region (60; 60a); and wherein at least one connection lever (58; 58a) is swivelably coupled to said connection lever carrier (56; 56a) in said first connection lever coupling region (60; 60a).

8. The torsional vibration damping arrangement according to claim 1, wherein said coupling lever arrangement (54; 54a) comprises a connection lever carrier (56; 56a) having a first connection lever coupling region (60; 60a); and wherein at least one connection lever (58; 58a) is swivelably coupled to said connection lever carrier (56; 56a) in said first connection lever coupling region (60; 60a).

9. The torsional vibration damping arrangement according to claim 8, wherein said at least one connection lever (58; 58a) comprises a second connection lever coupling region (62; 62a) and a third connection lever coupling region (66; 66a); and wherein said at least one connection lever (58; 58a) is coupled to said secondary side (30; 30a) of said vibration system (26; 26a) in said second connection lever coupling region (62; 62a) so as to be swivelable with respect to said secondary side (30; 30a) of said vibration system (26; 26a) and is coupled to said output region (20; 20a) in said third connection lever coupling region (66; 66a) so as to be swivelable with respect to said output region (20; 20a).

10. The torsional vibration damping arrangement according to claim 9, additionall comprising at least one drive lever (64; 64a) comprising a first drive lever coupling region (70; 70a) and a second drive lever coupling region (72; 72a), said at least one drive lever (64; 64a) swivelably coupled with said secondary side (30; 30a) of said vibration system (26; 26a) in said first drive lever coupling region (70; 70a) and swivelably coupled in said second drive lever coupling region (72; 72a) with said connection lever (58; 58a) in said second connection lever coupling region (62; 62a).

11. The torsional vibration damping arrangement according to claim 10, additionally comprising at least one driven lever (68; 68a) having a first and second driven lever coupling region (74, 74a; 76, 76a) and wherein said at least one driven lever (68; 68a) is swivelably coupled with said output region (20; 20a) in said first driven lever coupling region (74; 74a) and is swivelably coupled with said at least one connection lever (58; 58a) in said second driven lever coupling region (76; 76a) in said third connection lever coupling region (66; 66a) of said at least one connection lever (58; 58a).

12. The torsional vibration damping arrangement according to claim 10, wherein for said at least one connection lever (58; 58a), said second connection lever coupling region (62; 62a) and said third connection lever coupling region (66; 66a) are at different distances, respectively, from said first connection lever coupling region (60; 60a).

13. The torsional vibration damping arrangement according to claim 9, additionally comprising at least one driven lever (68; 68a) having a first and second driven lever coupling region (74, 74a; 76, 76a) and wherein said at least one driven lever (68; 68a) is swivelably coupled with said output region (20; 20a) in said first driven lever coupling region (74; 74a) and is swivelably coupled with said at least one connection lever (58; 58a) in said second driven lever coupling region (76; 76a) in said third connection lever coupling region (66; 66a) of said at least one connection lever (58; 58a).

14. The torsional vibration damping arrangement according to claim 13, wherein for said at least one connection lever (58; 58a), said second connection lever coupling region (62; 62a) and said third connection lever coupling region (66; 66a) are at different distances, respectively, from said first connection lever coupling region (60; 60a).

15. The torsional vibration damping arrangement according to claim 9, wherein for said at least one connection lever (58; 58a), said second connection lever coupling region (62; 62a) and said third connection lever coupling region (66; 66a) are at different distances, respectively, from said first connection lever coupling region (60; 60a).

16. The torsional vibration damping arrangement according to claim 15, wherein the distance of said second connection lever coupling region (62; 62a) from said first connection lever coupling region (60; 60a) is greater than the distance of said third connection lever coupling region (66; 66a) from said first connection lever coupling region (60; 60a).

17. The torsional vibration damping arrangement according to claim 9, wherein for said at least one connection lever (58), said second connection lever coupling region (62) and/ or said third connection lever coupling region (66) is movable toward said first connection lever coupling region (60) and/or away from said first connection lever coupling region (60).

18. The torsional vibration damping arrangement according to claim 9, wherein for said at least one connection lever (58), said second connection lever coupling region (62) and/or said third connection lever coupling region (66) is movable against a pre-loading force (80) toward said first connection lever coupling region (60) and/or away from said first connection lever coupling region (60).

19. The torsional vibration damping arrangement according to claim 8, wherein said at least one connection lever (58; 58*a*) comprises a second connection lever coupling region (62; 62*a*) and a third connection lever coupling region (66, 66*a*); and wherein said at least one connection lever (58; 58*a*) is coupled to said secondary side (30; 30*a*) of said vibration system (26; 26*a*) in said second connection lever coupling region (62; 62*a*) so as to be swivelable with respect to said secondary side (30; 30*a*) of said vibration system (26; 26*a*) and is coupled to said output region (20; 20*a*) in said third connection lever coupling region (66; 66*a*) so as to be swivelable with respect to said output region (20; 20*a*).

\* \* \* \* \*